A. BERNEY,
Assignor, by mesne assignments to THE GLOBE COMPANY.
Spark Arrester for Locomotives.
No. 9,409. Reissued Oct. 12, 1880.
FIG. I.
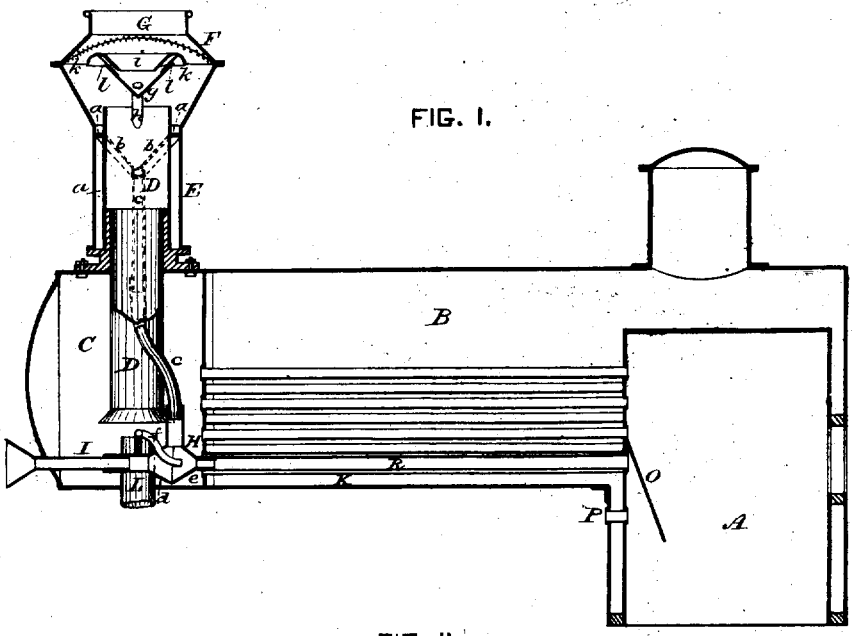
FIG. II.
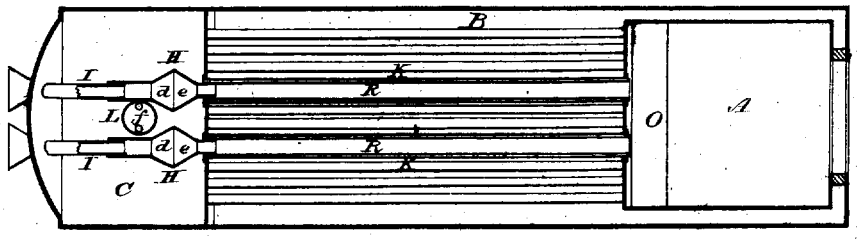
FIG. III.
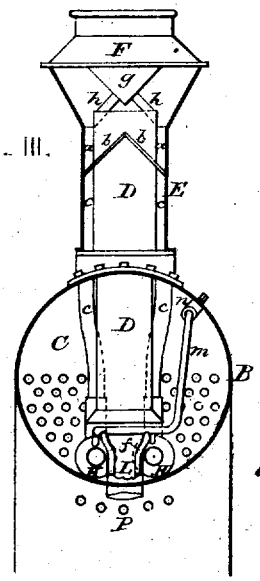
FIG. IV.
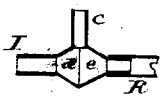
WITNESSES:
Geo. H. Keen,
Robt. Guard.
INVENTOR
Alfred Berney

UNITED STATES PATENT OFFICE.

ALFRED BERNEY, OF BOSTON, MASS., ASSIGNOR, BY MESNE ASSIGNMENTS, TO THE GLOBE COMPANY, OF HARTFORD, CONN.

SPARK-ARRESTER FOR LOCOMOTIVES.

SPECIFICATION forming part of Reissued Letters Patent No. 9,409, dated October 12, 1880.

Original No. 163,568, dated May 25, 1875. Application for reissue filed September 23, 1880.

*To all whom it may concern:*

Be it known that I, ALFRED BERNEY, of the city of Boston, in the county of Suffolk and State of Massachusetts, have invented certain new and useful Improvements in Spark-Arresters for Locomotives; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

In the drawings, Figure I is a vertical and longitudinal section. Fig. II is a horizontal section of the boiler-furnace, smoke-box, and chimney of a locomotive-engine with my invention. Fig. III is a front-end view with the head of the smoke-box off. Fig. IV is a vertical section of the spark-receiver, its educt and air-induct, all as hereinafter explained.

My invention has reference to mechanism or means for arresting sparks, cinders, or combustible products in the chimney and transferring them therefrom into the fire-place, the mechanism or mechanical means which contain my invention, or to which it is applied or is combined, containing a flue or flues leading from the chimney to the fire-box, through which flue or flues the sparks are not driven by continuous action of the steam-blast, but first fall into an annular chamber, and, by the action of a current of air forced into and through the return pipe or pipes, are drawn from said chamber down one or more pipes, connecting it with the return flue or flues, and driven through such flue or flues, which go through the boiler and to the fire place or box, the said combustible products, gaseous or carbonaceous as they may be, being carried or forced into the fire, to be consumed thereby, in order to be utilized or aid in producing heat.

The purpose of my additions to the mechanism, as aforesaid, is to prevent settlement of sparks or other matters in or their clogging each of the return-flues, and particularly at and near the junction of each with the pipe leading down into it from the receiving or annular chamber, and this I accomplish by means of an enlargement or chamber and a jet-pipe to lead steam, whether direct or waste, into such chamber, to clear it.

Furthermore, I have arranged in the fire-place at its back, and in rear of the return flue or flues, an inclined deflector or plate, and have provided the fire-box with one or a series of air-passages to open outward in advance of the deflector and into the atmosphere, so that one or more currents of air may rush through said passage or passages and impinge against the deflector, in order to be heated thereby, and to preserve it from being burned or injured by the fire, such deflector also being to deflect down into the fire the cinders and gases drawn through the return flue or flues. The entering air thus heated aids in the combustion of the gaseous or carbonaceous products in the fire-box.

In the drawings, A denotes the fire-box, B the boiler, C the smoke-box, and D the chimney, of an ordinary locomotive-engine. The chimney extends down within and above the smoke-box, and where projecting above it is surrounded concentrically by a casing, E, provided with an open bonnet, F, across which is a concave-convex wire-netting or strainer, G. There is an annular space or chamber, *a*, such chamber, as shown, being provided with a double-sloped bottom, *b b*, to lead to two pipes, *c c*, or conduits, that open out of and extend down from the chamber *a* and to and into auxiliary chambers H H, arranged as shown. I prefer to form each of the said chambers H of two hollow conic frustums, *d e*, united at their bases. Other forms may be used. Each of these auxiliary chambers opens at one end into one of two air-blast pipes, I I, and at its opposite end into one of two return flues or pipes, K K, that go through the lower part of the boiler and open into the fire-box or fire-place thereof, all being as shown. Into the interior of the steam-blast pipe L, that opens into the lower end of the chimney C, I lead two small ducts or pipes, *f f*, and continue them from the blast-pipe L to and into the auxiliary chambers H H of the return-flues K K, in manner as shown.

The air-blast pipes I I are open through the front head of the smoke-box, so as to lead air from the atmosphere into auxiliary chambers H H, and thence into the return-flues K K.

Above the chimney D D, and within the bonnet, is an inverted hollow cone, *g*, supported in position, as shown, by two pipes, *h h*, opening out of it and extending from the chimney, the said pipes, at their ends, opening into the annular chamber *a*.

Above the cone *g*, with a space between them, is a hollow conic frustum, *i*, provided with an intercepting and deflecting lip, *k*. The said frustum and lip are supported in position by standards *l*, projecting up from the cone *g*, all being arranged as represented, the frustum being open at its interior base.

The smoke and waste steam, after escaping from the top of the chimney D, flow or are forced up outside of the cone *g*, of any suitable construction, and the sparks, striking against the lips *k*, fall down into the said cone, then pass from the cone down through the pipes *h h* into the annular chamber *a*. The combined smoke, gases, and steam escape up through the frustum *i* and the wire-netting of the bonnet freely.

In each of the return-flues K, I place a movable interlining or guard tube, R, to extend from one end of the return-flue to the other, and to fit thereto. The auxiliary tube is to save the flue from wear and injury by the sparks.

After the guard-tube may have become worn by the heat and sparks I extract it from the return-flue and substitute another. This saves all necessity of removing the flues from the boiler and substituting others.

The said guard-tube R is for use with the said flue K only when the latter is combined with means, substantially as described, for drawing the sparks into and through the flue, and thence into the fire-box, to be there consumed. It is found, in practice, that a flue under such conditions is readily worn by the sparks, and to be kept in order it must be reenforced by the tube R.

Instead of the jet-pipes to lead from the waste-steam blast-pipe to the auxiliary chambers H H, a conduit to lead steam from the steam-space of the boiler to such chambers may be employed, or such conduits from the steam-space may also be used with those leading from the said blast-pipe. In the drawings the said conduit is shown at *m*, such being provided with a cock, *n*, to close or open it.

While the engine may be advancing on a railway air will be caused to pass through the air-inducts I I, and thence into and through the auxiliary chambers H H, and thence into and through the return-flues, such currents of air inducing currents down the educts *c c* of the annular chamber *a*, and thereby drawing with them the sparks or combustible products of such chamber down into the chambers H H, and expelling them therefrom through the return-flues K K. The steam-jets let into the auxiliary chambers serve to free them of any sparks or waste matters that may be in them or be disposed to remain in them, and will, when the jets are not over three-quarters of an inch in diameter, aid combustion very much.

Generally speaking, the chambers alone will prevent the gathering of the sparks and choking the return-flues at their junctions with the pipes *c c*. I have found that without such chambers combined and arranged with the pipes *c c*, the air-blast pipes I I, and the return-flues K K, clogging of the return-flues will immediately follow.

The jet-pipe from the boiler steam-space to the auxiliary chamber H enables me to clear the chamber when the engine may be either at rest or retrograding, the clearance while the engine may be advancing being effected by the steam deflected into the chamber from the steam-blast pipe. Such steam will also prevent smoke from issuing from the stack, and when let in in large quantities will deaden the fire, and thus prevent steam from generating too fast.

At the back of the fire-place, and with respect to the rear ends of the return-flues, as shown, there is an inclined plate or deflector, O, in advance of which and through the back of the fire-place, and to open into the atmosphere under the boiler, are one or more tubes or air-passages, P, such being to let air in upon the deflector, so as to be heated thereby and to preserve it from injury by the fire. The air in thus entering and impinging against the deflector becomes heated by the abstraction of heat from the deflector and aids in combustion of the smoke and gases.

Having thus described my invention, what I claim, and desire to secure by Letters Patent, is—

1. In a spark-arrester, an auxiliary chamber, H, in combination with an air-blast pipe, I, return-flues K, conduit *c*, annular chamber *a*, and steam-pipe *f*, all substantially as and for the purpose specified.

2. In combination with the air-pipe I, auxiliary chamber H, induct I, annular chamber *a*, conduit *c*, return-flues K, and a pipe or pipes, *f* or *m*, connecting with the steam-space of the boiler or the exhaust-steam from the cylinders, all substantially as and for the purpose described.

3. In combination with the auxiliary chamber H, the air-blast pipe I, and the return-flue K, applied to a boiler and its smoke-box, a pipe or pipes, *f* or *m*, to lead steam from the steam-blast pipe or from the steam-space of the boiler, or both, into the said chamber H, all being substantially as and for the purpose described.

4. The combination, with the deflector arranged in the fire-place, and with the rear ends of the return-flues, of one or more air-inlets, P, arranged in advance of the deflector, all substantially as and for the purpose set forth.

5. The re-enforce guard-tube R, in combination with the return-flue K and fire-box, all being substantially as described.

6. In a spark-arrester, an annular chamber connected at one side by pipes to a conduit, *c*, leading from the stack and receiving the sparks, &c., and at the other side to return-flues, through which the sparks and products of combustion are forced back into the furnace by one or more jets of steam, substantially as specified.

7. The combination of the auxiliary chamber H with the air-blast pipe I, return-flue K, conduit *c*, annular chamber *a*, means for intercepting the sparks and deflecting them into it, and a live or exhaust steam jet for forcing the sparks and products of combustion back into the furnace, all arranged substantially as shown and herein described.

8. In a spark-arrester, the combination of the chamber *a*, conduit *c*, chamber H, and return-flue K, arranged substantially as shown and specified.

9. The method, substantially as herein described, of controlling and utilizing as fuel the unconsumed sparks and products of combustion by means of a conduit from the upper part of the stack leading to an enlarged chamber or chambers in one or more return-flues, through which they are forced by a combined steam and air jet into the furnace, substantially as specified.

In testimony that I claim the foregoing I have hereunto set my hand this 16th day of September, 1880.

ALFRED BERNEY.

Witnesses:
GEO. M. MILLER,
ROBT. GUARD.